US005495754A

United States Patent [19]
Starr, Jr. et al.

[11] Patent Number: 5,495,754
[45] Date of Patent: Mar. 5, 1996

[54] ENVIRONMENTAL WIND TUNNEL

[75] Inventors: Rogers F. Starr, Jr., Manchester; Steve Pearson, Cowan; Ronald G. Lutz, Tullahoma, all of Tenn.

[73] Assignee: Sverdrup Technology, Inc., Tullahoma, Tenn.

[21] Appl. No.: 177,031

[22] Filed: Jan. 4, 1994

[51] Int. Cl.⁶ .................................................. G01M 9/00
[52] U.S. Cl. .................................................. 73/147; 73/146
[58] Field of Search ........................................ 73/147, 146

[56] References Cited

U.S. PATENT DOCUMENTS

| | | | |
|---|---|---|---|
| 3,435,671 | 4/1969 | Hildt | 73/147 |
| 3,638,483 | 2/1972 | Shouman | 73/147 |
| 3,903,740 | 9/1975 | Baldwin | 73/147 |
| 3,952,590 | 4/1976 | Howard et al. | 73/147 |
| 4,073,188 | 2/1978 | Slezinger et al. | 73/147 |
| 4,817,422 | 4/1989 | Allen | 73/147 |

*Primary Examiner*—Richard Chilcot
*Assistant Examiner*—Jewel V. Artis
*Attorney, Agent, or Firm*—Kenyon & Kenyon

[57] ABSTRACT

An environmental wind tunnel for producing air flow over an automotive vehicle includes a source of air under pressure and an elongated housing for receiving an automotive vehicle. The environmental wind tunnel has an upstream end coupled to the downstream end of the source of air under pressure, so that air is blown axially through the housing from its upstream end to its downstream end. The environmental wind tunnel also includes a large area ratio contraction with large area corner sections, large area duct work with a low angle diffuser, a large area fan, and acoustic treatments on the turning vanes, test chamber walls, and corner duct interior surfaces. In addition, in-flow acoustic absorption panels, and one or more flow conditioning screens may also be included in the environmental wind tunnel.

22 Claims, 5 Drawing Sheets

| TEST SPEED (MPH) | FACILITY POWER REQUIREMENTS,* kw | | | | | |
|---|---|---|---|---|---|---|
| | INVENTION | | | PRIOR ART | | |
| | FAN | REFRIGERATION | TOTAL | FAN | REFRIGERATION | TOTAL |
| 100 | 370 | 240 | 610 | 570 | 330 | 900 |
| 120 | 630 | 400 | 1030 | 1000 | 570 | 1570 |
| 140 | *1000 | 630 | 1630 | 1590 | 900 | 2490 |
| 160 | 1500 | 930 | 2430 | CONDITION NOT ACHIEVABLE | | |

*ASSUMING AMBIENT TEMPERATURE, 70°F, CONDITIONS

FIG.3

ENVIRONMENTAL WIND TUNNEL

FIELD OF THE INVENTION

The present invention relates to wind tunnels and more specifically relates to environmental wind tunnels.

BACKGROUND OF THE INVENTION

Automotive environmental testing has conventionally consisted of engine cooling system testing and the testing of systems such as the heating, ventilation, and air conditioning systems which augment passenger comfort. The requirements of these tests led to the development of automotive environmental test facilities consisting of test chambers equipped with dynamometers, solar simulators, air flow systems, refrigeration plants, humidity/precipitation systems and other support systems. Environmental test facilities have most often been designed for one specific purpose such as the testing of low temperature starting and driveability; the testing of high-temperature, grade, load performance; or the development of vehicle exhaust system components.

More recently, automotive environmental testing has expanded to include sophisticated engine management systems, fuels (octane rating) compatibility, and European high speed performance. These test requirements have presented the need for higher speed capability, low background noise levels, and higher flow quality including uniform velocity, temperature and low turbulence. Further, due to the increased complexity and cost of these test facilities, it is desirable to combine test capabilities into a single multi-purpose test facility. However, because the desired test capabilities often conflict in terms of facility design requirements, room remains for improvement over existing facilities in the achievement of the performance goals within a reasonable cost and with an energy efficient and reliable design.

The objects of the present invention are to provide an environmental wind tunnel which can provide high speed operation, relatively low background noise level, and which achieves high flow quality while at the same time, maintaining low energy consumption and reasonable facility construction cost.

SUMMARY OF THE INVENTION

The present invention is directed to an environmental wind tunnel including a large area fan, a low angle diffuser downstream of the fan., at least one large area corner downstream of the low angle diffuser and a large contraction ratio nozzle including a flow conditioning screen connected to the environmental test chamber to produce high speed flow, low background noise, and high flow quality test conditions for the test vehicle.

An air return circuit according to the present invention may also include a contraction area ratio of from 5.0 to 6.0, a low angle diffuser downstream of the large area fan, a large corner cross section, in-flow acoustic absorption panels, and a flow conditioning screen at the upstream end of the nozzle. These features, combined, form a unique facility air return system which meets the combined testing performance requirements stated above.

BRIEF DESCRIPTION OF THE DRAWINGS

The above and other objects, advantages and features for the invention will become more apparent when considered with the following specification and the accompanying drawings wherein:

FIG. 3 is a table including comparative power requirements for an environmental wind tunnel facility according to the present invention;

DETAILED DESCRIPTION

Figure 1:
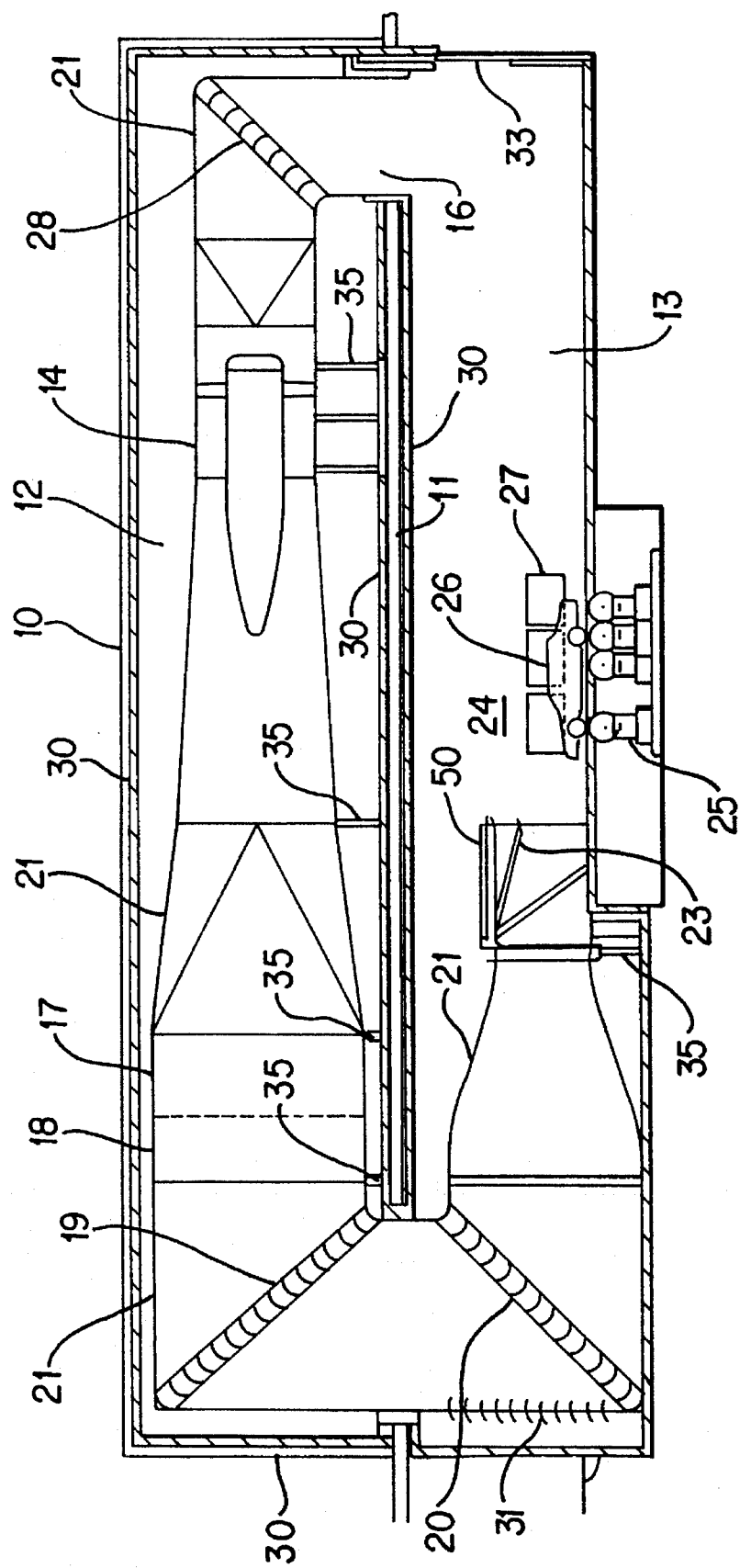
FIG. 1 is a sectional elevational view of a prior art environmental automotive wind tunnel test facility.

Referring first to FIG. 1, the prior art environmental wind tunnel includes a building 10 which is divided by a ceiling partition 11 into an upper conditioned air source section 12 and a lower test chamber section 13. Air from a turbine or blower 14 is guided through a conditioning section which includes a heat exchanger 17 and a steam injection unit 18 to establish the climatic conditions of air flowing over a vehicle 26. Two turning vanes 19 and 20 guide the conditioned air in the duct work 21, to a controllable vane 23 and from the vane 23, out a nozzle 50 into the test chamber 24. The vehicle 26 is positioned on a testing dynamometer and rolls 25 in front of control room windows 27. Duct work 21 is supported on duct work support stands 35. The air may be returned to the turbine 14 via further duct work 16 and turning vanes 28. Insulation 30 is provided when needed in the facility and by-pass louvers 31 may likewise be provided. The vehicle 26 is introduced into the test chamber 24 through insulated doors 33.

This prior art wind tunnel included a contraction area ratio of from 2.0 to 4.0, a flow area of from 2.0 to 4.0 times the nozzle area and a fan flow area of approximately 0.75 times the nozzle area. The flow area of the corner at the fan inlet in this wind tunnel is less than 2.0 times the fan inlet area. This prior art wind tunnel also included a wide angle diffuser having a total equivalent angle of over 25° downstream of the fan.

Figure 2:
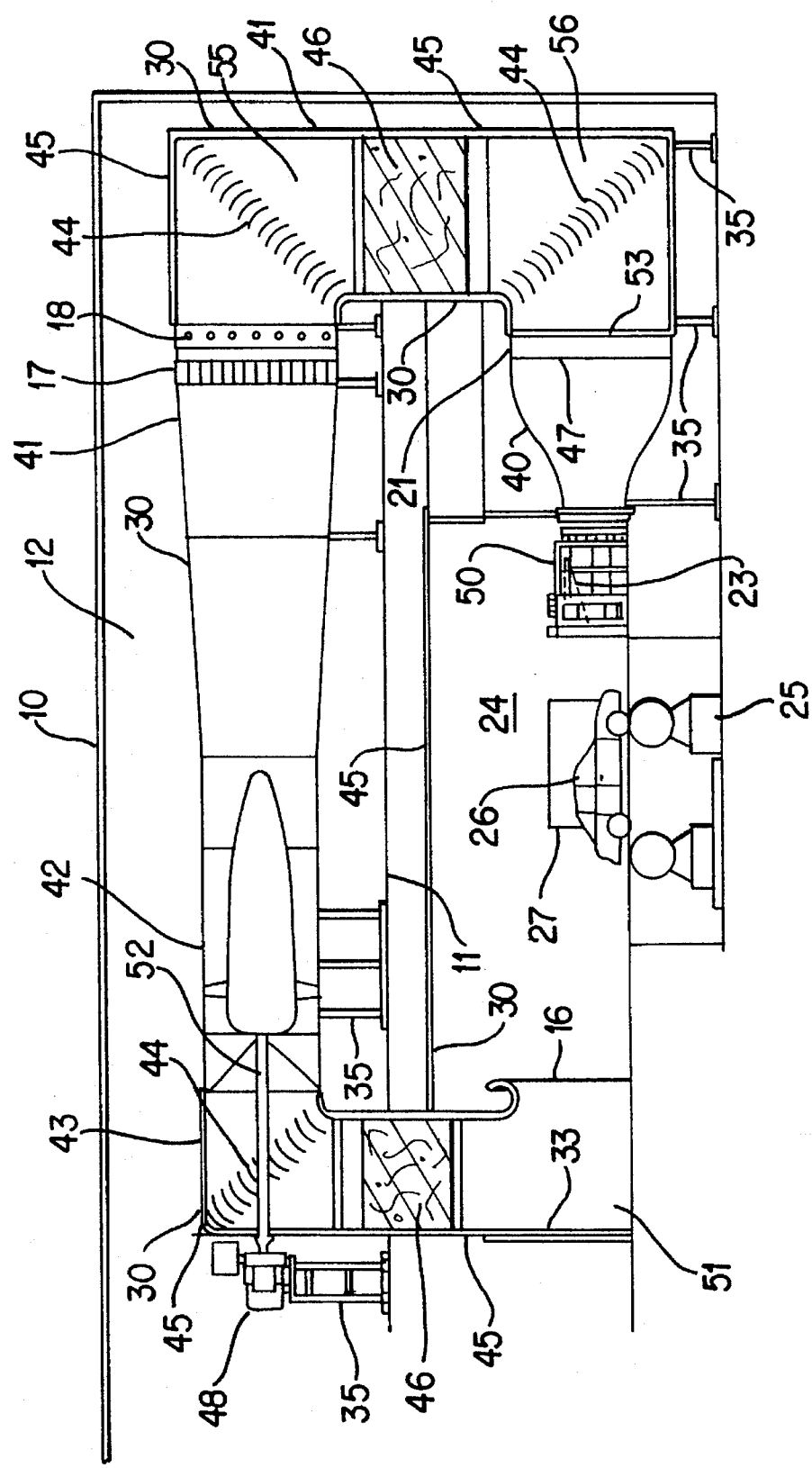
FIG. 2 is a sectional elevational view of an environmental automotive wind tunnel or test facility incorporating an air return circuit according to the present invention.

Referring now to FIG. 2, wherein like elements are denoted by like reference numerals, a wind tunnel according to the present invention includes a large area ratio contraction 40 which is connected to a large flow area ducting system 41. A large flow area fan 42 is interconnected with the ducting system and is powered by a motor 48 via a shaft 52. The motor 413 is supported by a support base 35. A wind tunnel according to the present invention may include up to four flow turns, or corners 51, 43, 55 and 56, the first through the fourth corners, respectively which may be equipped with acoustically treated turning vanes 44.

In the described embodiment, turning vanes have been omitted from the downstream corner 51 because the turning vanes 44 may interfere with the entry of a vehicle 26 to the testing chamber through the doors 33. However, those skilled in the art will understand that removable turning vanes may be included in this corner. A large flow area corner, the second corner 43, is included upstream of the fan while large flow area corners 55 and 56 are disposed downstream of the large flow area fan 42.

Figure 4:
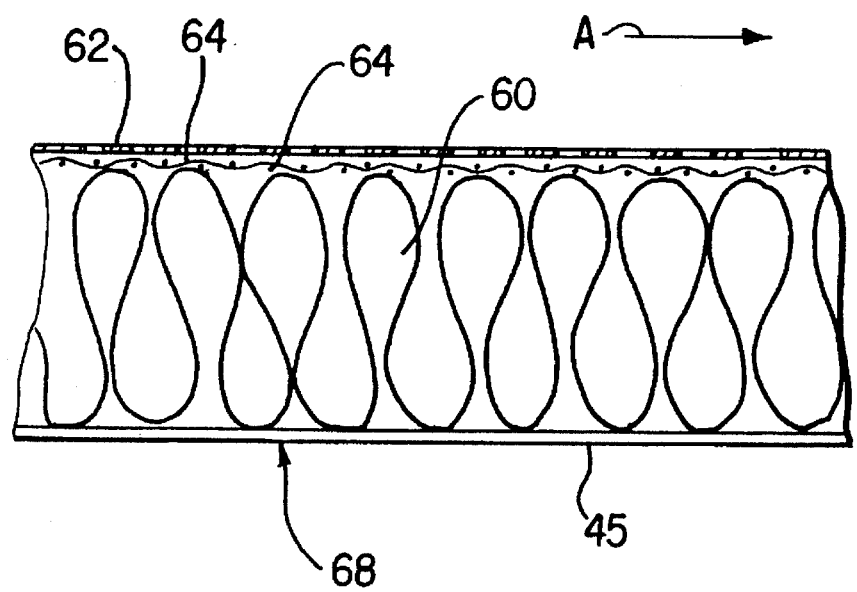
FIG. 4 shows a cross-sectional view of an acoustically treated surface which may be included in a wind tunnel according to the present invention.

As shown in FIGS. 2 and 4, portions 45 of the test chamber enclosure and portions of the surfaces of the corner duct work may also be acoustically treated. An interior space of an acoustically treated portion 45 includes an acoustic absorbing material 60 and an outer perforated plate 62. A wire mesh screen 64 is located between the acoustic absorbing material 60 and the outer perforated plate 62 while flow past the acoustically treated portion 45 is indicated by the arrow A.

The acoustic treatment of portions of the surfaces of the test chamber and the surfaces of the corner duct work varies in dependence upon the flow velocities, the contaminants present in the air and the structural requirements of the surface, i.e. the need for workers to be able to walk on the surface. In low velocity regions where wear and tear is less of a problem, the batts and cones may be attached to the walls with no surface treatment. In higher velocity regions and in regions on which workers will be walking, a surface treatment consisting of thin metal sheet with perforations may be employed. The thickness of the metal sheet, the size of the perforations and the thickness of the acoustic material are selected based on the acoustic frequencies which are to be absorbed. In regions where the flow velocity is very high, the perforated sheet material may be accompanied by a fine mesh, screen material placed behind it. Contaminants such as oil and other chemicals may necessitate periodically washing the acoustically treated surfaces to remove the build-up. The fill material can also be covered with a thin mylar film which keeps the contaminants from reaching the fill fibers or foam and facilitates cleaning.

Figure 5:
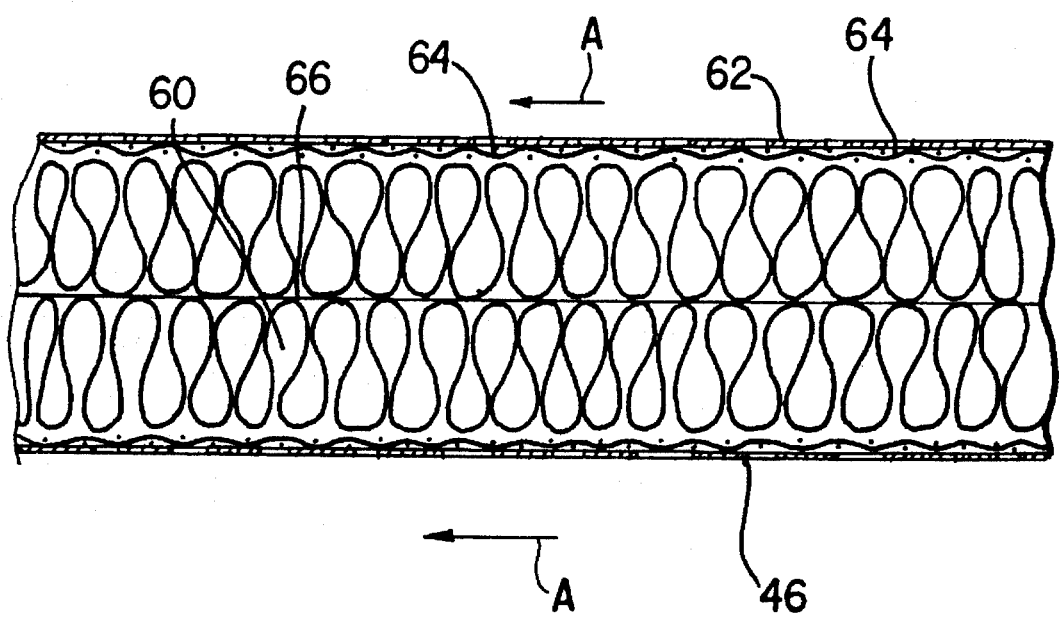
FIG. 5 shows a cross-sectional view of an acoustically treated inflow panel which may be included in a wind tunnel according to the present invention.

Similarly, as shown in FIGS. 2 and 5, in-flow acoustic absorbing panels 46 may also be included upstream of the second and fourth corners. An interior space of the acoustic absorbing panels 46 includes acoustic absorbing material 60 and an outer perforated plate 62. A wire mesh screen 64 is located between the acoustic absorbing material 60 and the outer perforated plate 62 while flow past the acoustic absorbing panel 46 is indicated by the arrow A. In addition, a flow condition screen 47 may be included in the ducting upstream of the nozzle 50. Those skilled in the art will recognize that the flow conditioning screen 47 may, for example, be accompanied by a honeycomb flow straightener.

Figure 6:
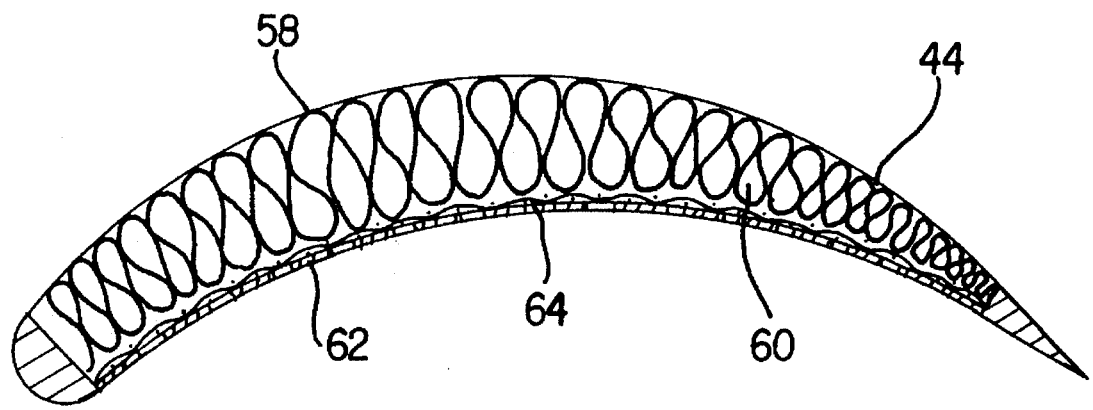
FIG. 6 shows a cross-sectional view of an acoustically treated turning vane according to a first embodiment of the present invention.

As shown in FIG. 6, an acoustically treated turning vane 44 may be formed having at least one curved acoustic panel 58 on its outer surfaces with an interior filled with acoustic absorbing material 60. A second outer surface of the acoustically treated turning vane 44 may include a perforated plate 62 with a wire mesh screen 64 located between the acoustic absorbing material 60 and the perforated plate 62. Those skilled in the art will recognize that an acoustically treated turning vane 44 may be formed with curved acoustic panels 58 on both of its exterior surfaces.

Figure 7:
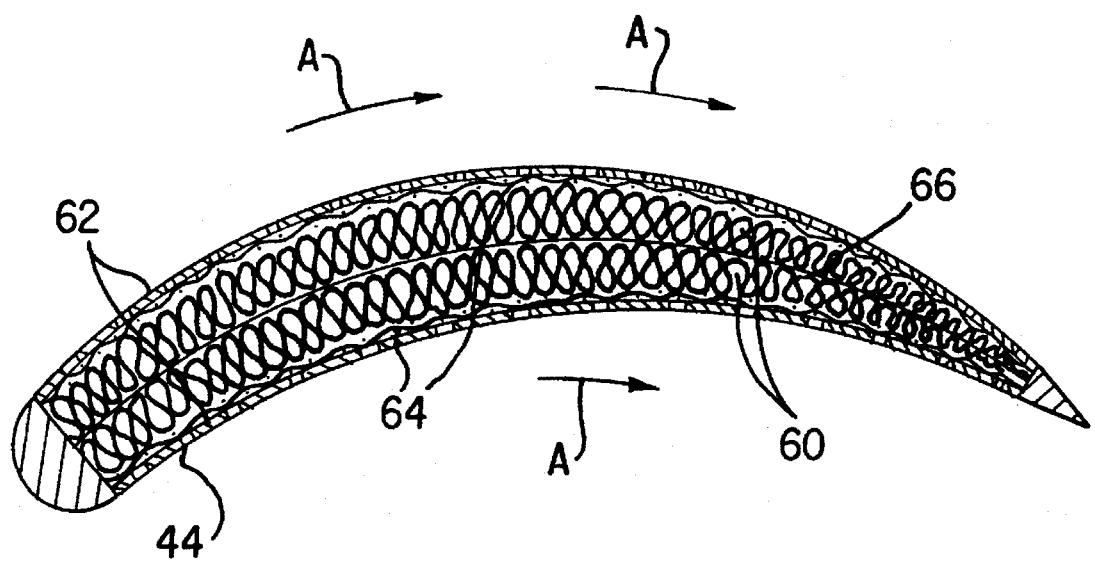
FIG. 7 shows a cross-sectional view of an acoustically treated turning vane according to a second embodiment of the present invention.

Alternatively, as shown in FIG. 7, an acoustically treated turning vane 44 may be formed having an interior filled with acoustic absorbing material 60 both of its outer surfaces formed of perforated plates 62 with wire mesh screens 64 located between the acoustic absorbing material 60 and the perforated plates 62. This acoustically treated turning vane 44 may also include a central panel 66 of steel or other suitably strong material. Flow around the acoustically treated turning vane 44 is indicated by the arrows A.

The acoustic material may preferably be fiberglass batts which may be held in place with a thin sheet of perforated metal or other material to protect the fiberglass from the effects of the high velocity air. These fiberglass batts may preferably be constructed of loosely woven fiberglass cloth bags filled with loose fiberglass strand material. In regions where flow velocities are low, acoustic absorption panels may preferably be constructed of closed cell foam blocks cut into the shape of a pyramid or cone. These may be arranged in patterns on a surface with the tips of the blocks pointed outward from the wall.

In contrast to the prior art wind tunnel described above, a wind tunnel according to the present invention includes a contraction area ratio of from 5.0 to 6.0, a flow area of from 5.0 to 6.0 times the nozzle area and a fan flow area of approximately 1.1 times the nozzle area wherein the fan flow area is equal to the total frontal area of the large area fan minus the frontal area of a center body of the large area fan. The flow area for the corner at the fan inlet in this wind tunnel is approximately 2.2 times the fan inlet area. This wind tunnel may also include a low angle diffuser 53 downstream of the large area fan. This low angle diffuser 53 preferably has an angle of less than 12° is included in the large area duct work between the large area fan and the large area corner section located immediately downstream of the large area fan and preferably has an equivalent total included angle of less than 12°.

Wind tunnels according to the present invention may also include acoustic treatment of some or all of the turning vanes, portions of the test chamber walls, corner duct walls and the in-flow absorbing panels. In addition, a wind tunnel according to the present invention may include a flow conditioning screen upstream of the large area ratio contraction.

Those skilled in the art will recognize that the depth of the acoustic absorbing material and the size and spacing of the perforations may be varied to tune the acoustic absorption performance to specific frequency ranges.

In addition, although the turbine or blower and the related duct work are shown as positioned over the test chamber, it will be appreciated by those skilled in the art that these units may be on the same plane, although this vertical assembly is preferred.

A comparison of the power requirements for the air circuit fan and the refrigeration system used to remove the heat generated by the fan and the test vehicle for the wind tunnel according to the present invention and for the prior art wind tunnel is given in FIG. 3. As shown, the power consumption for an environmental wind tunnel equipped according to the present invention is typically approximately 65% of that required for the prior art wind tunnel. Further, higher test speeds may be obtained through the use of the wind tunnel according to the present invention because of the lower air pressures required to drive the air flow through the air return circuit. A test speed of 160 mph, which is typically not achievable with the prior art, may be achieved by a wind tunnel according to the present invention.

Considering an environmental test facility which operates for two shifts per day and for fifty weeks per year, and which is operated at a typical test condition corresponding to 120 mph for 40-percent of the operating time, a wind tunnel according to the present invention would require a power consumption of 1,650,000 kilowatt hours. Operation of a prior art wind tunnel as described would require a power consumption of 2,500,000 kilowatt hours. The performance of a wind tunnel according to the present invention is enhanced relative to that of the prior art while the power consumption is substantially reduced.

The flow quality in the wind tunnel according to the present invention represents an improvement over the prior art wind tunnel described above. The velocity uniformity achieved by the present invention is ±0.5% while that achieved by the prior art wind tunnel is ±2%. The temperature uniformity achieved by a wind tunnel according to the present invention is ±1° F. while that achieved with the wind tunnel according to the present invention is ±2° F. and the turbulence intensity in the wind tunnel according to the present invention is ≦1% while the turbulence intensity in the prior art wind tunnel is ≦4%.

Improved flow quality is becoming increasingly important in the design of environmental automotive wind tunnels because of the increased importance of accurate thermodynamic test results for engine cooling, engine management, and vehicle interior climate control systems.

Test chamber noise levels for a wind tunnel according to the present invention at 100 mph operating speed are within a range between 80 and 100 Db(A) and are preferably between 80 and 90 Db(A). The results for the wind tunnel according to the prior art at 100 mph are 110 to 115 Db(A).

There has been a recent demand for low background noise levels as a result of the need to test fuel blends for engine "knock" characteristics. Of importance is the passenger compartment perceived acoustic emissions from the engine. A low wind tunnel background noise level is required to perform these types of tests.

It will be apparent that the embodiments disclosed herein are exemplary and that various modifications can be made in construction and arrangements within the scope of the invention as defined in the appended claims.

What is claimed is:

1. A wind tunnel for producing air flow over a vehicle, said wind tunnel comprising:

a test chamber for receiving a vehicle, wherein at least a portion of the surfaces of the test chamber include acoustic treatment means;

a large area fan;

a low angle diffuser, an upstream end of which is disposed adjacent to a downstream end of the large area fan;

a first section of large area duct work an upstream end of which is coupled to a downstream end of the low angle diffuser for directing air from the downstream end of the low angle diffuser to a downstream end of the first section of large area duct work, wherein a flow conditioning screen is disposed within a downstream portion of the first section of large area duct work and wherein at least a portion of the surfaces of the first section of large area duct work include acoustic treatment means;

a large area ratio contraction, an upstream end of which is coupled to the downstream end, of the first section of large area duct work, wherein the surfaces of the large area ratio contraction do not include acoustic treatment means;

a nozzle, an upstream end of which is coupled to the downstream end of the large area ratio contraction, the downstream end of the nozzle being open into the test chamber;

a second section of large area duct work for directing air from the testing chamber to an upstream end of the large area fan, wherein at least a portion of the surfaces of the second section of large area duct work include acoustic treatment means;

a third section of large area duct work extending from the upstream end of the large area fan to the upstream end of the first section of large area duct work, wherein the surfaces of the third section of large area duct work do not include acoustic treatment means; and at least one large area corner section for directing air within one of the first and second sections of large area duct work around a corner, wherein the at least one large area corner section includes a turning vane having acoustic treatment means and wherein at least a portion of the interior surfaces of the large area corner include acoustic treatment means.

2. A wind tunnel according to claim 1, wherein a large area corner section downstream of the large area fan is of the same flow area as the largest portion of the first section of large area duct work.

3. A wind tunnel according to claim 2, wherein the low angle diffuser has an overall equivalent total included angle of less than 12°.

4. A wind tunnel according to claim 3, wherein a fan flow area, which is equal to the total frontal area of the large area fan minus the frontal area of a center body of the large area fan, is greater than 1.1 times the area of the downstream end of the nozzle.

5. A wind tunnel according to claim 4, wherein the flow area of a large area corner section located upstream of the large area fan is approximately 2.2 times the flow area of the large area fan.

6. A wind tunnel according to claim 1, including at least two large area corner sections having turning vanes.

7. A wind tunnel according to claim 6, wherein panels including acoustic treatment means are applied to the test chamber walls and ceiling.

8. A wind tunnel according to claim 7, wherein panels including acoustic treatment means are applied to the interior walls of two or more corner sections.

9. A wind tunnel according to claim 8, wherein in-flow panels including acoustic treatment means are mounted in various sections of the second section of large area duct work.

10. A wind tunnel according to claim 1, wherein the turning vane having acoustic treatment means includes an interior space filled with fiberglass batts.

11. A wind tunnel according to claim 1, wherein the turning vane having acoustic treatment means includes a perforated exterior surface.

12. A wind tunnel according to claim 7, wherein the panels having acoustic treatment means include an interior space filled with fiberglass batts.

13. A wind tunnel according to claim 12, wherein acoustic treatment panels include a perforated exterior surface.

14. A wind tunnel according to claim 7, wherein the acoustic treatment panels include a fiberglass interior filling.

15. A wind tunnel according to claim 1, wherein the acoustically treated turning vane includes a fiberglass interior filling.

16. A wind tunnel according to claim 15, wherein the acoustically treated turning vane includes one perforated exterior surface.

17. A wind tunnel according to claim 1, further including an in-flow acoustic absorption panel.

18. A wind tunnel according to claim 17 wherein the acoustically treated in-flow acoustic absorption panel includes one perforated exterior surface.

19. A wind tunnel according to claim 17, wherein the acoustically treated in-flow acoustic absorption panel includes a fiberglass interior filling.

20. A wind tunnel according to claim 1, wherein the contraction section is equipped with a flow conditioning screen.

21. A wind tunnel according to claim 1, an acoustic level in the test chamber at a wind speed of 100 mph is within a range between 80 and 100 Db(A).

22. A wind tunnel according to claim 1, wherein a top wind speed is at least 160 mph.

* * * * *